United States Patent [19]

Bridges

[11] Patent Number: 4,904,055
[45] Date of Patent: Feb. 27, 1990

[54] VARIABLE APERTURE FORMED BY LINEARLY MOVABLE ELEMENTS

[75] Inventor: Mark E. Bridges, Spencerport, N.Y.
[73] Assignee: Eastman Kodak Company, Rochester, N.Y.
[21] Appl. No.: 251,641
[22] Filed: Oct. 3, 1988
[51] Int. Cl.⁴ ............................................. G02B 26/02
[52] U.S. Cl. .................................... 350/272; 350/319
[58] Field of Search ............... 350/272, 319, 448, 449; 354/245, 246, 247, 270; 250/515.1

[56] References Cited

U.S. PATENT DOCUMENTS

| | | | |
|---|---|---|---|
| 2,412,424 | 12/1946 | Rath | 95/64 |
| 4,079,390 | 3/1978 | Iwata et al. | 354/44 |
| 4,202,602 | 5/1980 | Torres | 350/272 |
| 4,497,557 | 2/1985 | Petersen | 354/234.1 |
| 4,751,544 | 6/1988 | Saito | 354/452 |
| 4,797,700 | 1/1989 | Tsuji et al. | 354/270 |

Primary Examiner—Bruce Y. Arnold
Assistant Examiner—Ronald M. Kachmarik
Attorney, Agent, or Firm—James A. Smith

[57] ABSTRACT

A plurality of aperture blades are each provided with an opening having a V-shaped edge, such that when the blades are superimposed they cooperate to define a six-sided aperture. The blades are each mounted for rectilinear movement by a pair of guide pins. Cam pins supported on a driver rotated by a stepper motor engage cam slots in the blades and position them rectilinearly to change the aperture size.

8 Claims, 2 Drawing Sheets

VARIABLE APERTURE FORMED BY LINEARLY MOVABLE ELEMENTS

BACKGROUND OF THE INVENTION

1. Field of the Invention

The present invention relates to apparatus for forming apertures in optical systems and more specifically to apparatus for forming a nearly circular variable aperture using linearly movable elements.

2. Description of the Prior Art

Apparatus for forming apertures in an optical path are disclosed in the prior art. Conventionally, most apparatus employ blades which are rotated to position the blades toward or away from an opening to vary its size. While such apparatus effectively produce variable apertures, they do not achieve the precise incremental resolution required in systems employing digital processing of images in a video system.

SUMMARY OF THE INVENTION

In accordance with a preferred embodiment of the invention, a plurality of aperture blades having surfaces which cooperate to define a variable aperture are mounted for rectilinear movement to change the size of the aperture. Means are provided to move said blades simultaneously in predetermined increments to incrementally vary the size of the aperture.

BRIEF DESCRIPTION OF THE DRAWINGS

Other advantages of the present invention will become apparent from the following detailed description of a preferred embodiment of the invention taken in connection with the accompanying drawings wherein.

DETAILED DESCRIPTION OF THE INVENTION

Figure 1:
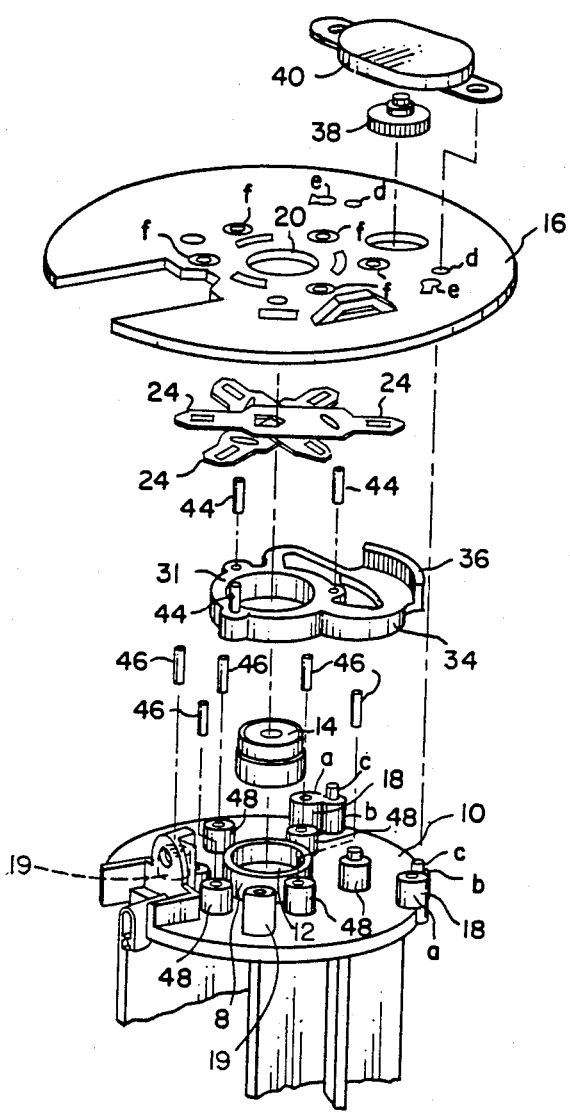
FIG. 1 is an exploded perspective view of apparatus for supporting a lens and including apparatus for defining a variable aperture in accordance with the invention.

Referring to FIG. 1 of the drawings, there is shown a lens mount of the type used for example in a film-to-video display apparatus. The lens mount includes a flat circular plate 10 having a cylindrical central extension 8 provided with a central opening 12 adapted to receive a lens assembly 14. An upper cover plate 16 is mounted on the plate 10 in spaced relationship therewith by two pairs of spacers 18 and 19 extending upwardly from the lower plate 10. The two upper spacers 18 each comprise two parallel cylindrical portions (a) and (b). The larger portion (a) is bored and threaded, and the smaller portion (b) is provided with a locater pin (c) which is received by a complimental hole (d) in the plate 16 and mounting flanges of stepper motor 40 to support the latter. When the plate 16 is placed on the spacers 18, it is positioned angulary until the pins (c) of spacers 18 enter their complimental holes (d) whereupon the upper plate 16 will seat against the spacers 18. The remaining two spacers 19 comprise only the larger portion (a) which is bored and threaded. Screws (not shown) will then be inserted into holes (e) which will be aligned with the portions (a) and tightened to firmly attach the upper plate 16 to the lower plate 10 to enclose the assembly. An opening 20 in the upper plate 16 is aligned with the optical path to permit light to reach the lens assembly 14.

Figure 2:
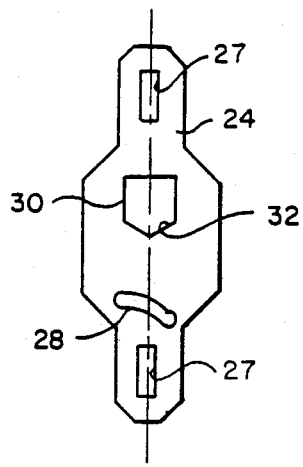
FIG. 2 is a plan view of one of the aperture blades shown in FIG. 1.

A variable aperture for the optical path is defined by a plurality of (in this case 3) aperture blades 24, one of which is depicted in detail in FIG. 2. As shown in FIG. 2, each blade 24 comprises an elongated flat blade member having a guide slot 27 in each end, a cam slot 28 adjacent one end and an aperture opening 30 in the center.

Figure 4:
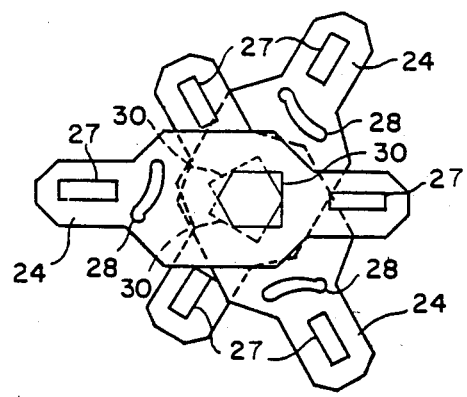
FIG. 4 is a plan view of the aperture blades in overlapping relationship to form a six-sided aperture.

As shown in FIG. 2, each aperture opening 30 comprises a generally rectangular opening having a V-shaped side 32. The three blades are positioned with their respective longitudinal axis at 60 degree angles with each other so that their respective V-shaped aperture sides 32 cooperate to form a six-sided aperture as shown in FIG. 4. Movement of the three blades simultaneously along their respective longitudinal axis will increase or decrease the aperture size depending on the direction of movement.

The aperture blades 24 are positioned by an aperture driver 31 comprising a ring like structure adapted to be rotatably mounted on cylindrical extension 8. The driver 31 has an intergral arm 34 on which is formed a sector gear 36 adapted to be engaged by a pinion 38 of a stepper motor 40 mounted on the upper surface of plate 16 by pins (d). Upon energization of the stepper motor 40, pinion 38 will rotate and drive sector gear 36 to angularly position the aperture blade driver 31 on the cylindrical extension 8 to effect rectilinear displacement of the aperture blade as now will be described.

The aperture blade driver 31 is provided with three cam pins 44 which are received by the cam slots 28 respectively when the aperture blades 24 are placed on the aperture blade driver 31. A plurality (in this case six) of equally radially spaced guide pins 46 are mounted in cylindrical extensions 48 of the lower plate 10 respectively. The extensions 48 are shorter in height than the spacers 18. The other end of each guide pin is received by a complimentally spaced bore (f) in the cover plate 16.

Each diametrically opposed pair of guide pins 46 are received by the elongated guide slots 27 respectively of an aperture blade. Each blade is thus restricted to rectilinear movement for a distance determined by the length of its guide slots.

Figure 3:
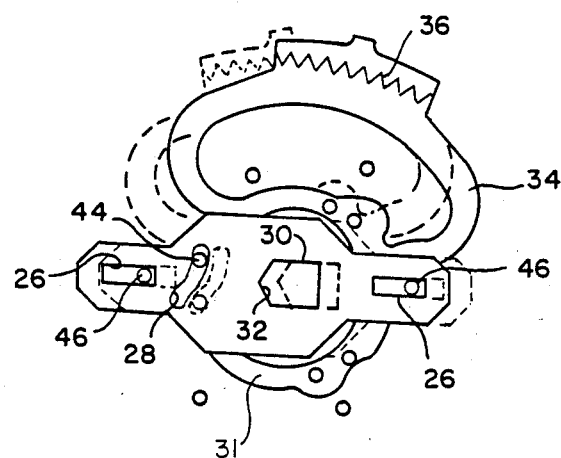
FIG. 3 is a plan view of the sector gear driver and one of the aperture blades shown in FIG. 1 illustrating how open and closed positions of the aperture blade are achieved.

The operation of the apparatus will be apparent from FIG. 3 which illustrates the aperture blade driver 31 displacing one of the aperture blades 24. The maximum open position of the aperture is depicted by the solid lines. In this position, the pin 44 will be at one end of cam slot 28. If the stepper motor is activated to rotate the driver 31 counterclockwise, the pin 44 will rotate to displace aperture blade 24 to the right in a rectilinear path defined by the shape of the cam slot 28 and by two of the pins 46, the dashed lines indicating the maximum or closed condition of the aperture. The other two blades will move in an identical manner. Thus a variable aperture is established by actuation of the stepper motor 40.

It will now be apparent that the disclosed embodiment comprises an efficient low cost apparatus for providing a six-sided aperture utilizing three rectilinearly movable blades activated by cam action.

The present invention has been described in detail with particular reference to a preferred embodiment thereof, but it will be understood that variations and modifications can be effected within the spirit and scope of the invention.

I claim:

1. Apparatus for providing an aperture in an optical path comprising:
    at least three blades having openings with sides that cooperate to define an aperture;
    means for mounting said blades for rectilinear movement to vary the size of said aperture; and
    cam means actuatable for simultaneously moving said blades to vary said aperture.

2. Apparatus for providing an aperture as claimed in claim 1 further including means for actuating said cam means in predetermined increments to incrementally move said blades and incrementally vary the size of said aperture.

3. Apparatus for providing an aperture as claimed in claim 2 wherein each of said blades comprises an elongated blade member having a generally rectangular opening, one side of each opening being generally V-shaped, the openings of said members overlapping around a central axis whereby their respective V-shaped sides cooperate to define said aperture, said aperture being six-sided.

4. Apparatus for providing an aperture as claimed in claim 3 wherein each of said blades includes a pair of elongated guide slots; and
    said apparatus further includes pins received by said slots to establish a rectilinear path of movement for said blades.

5. Apparatus for providing an aperture as claimed in claim 4 wherein said cam means comprise a cam slot in each of said blade members and a cam pin received by each of said cam slots; and
    said apparatus further including means for simultaneously positioning said cam pins to move said blade members.

6. Apparatus for providing an aperture in an optical path comprising:
    a pair of plates mounted together in spaced relationship;
    at least three elongated movable aperture blades positioned between said plates in overlapping relationship with each other;
    said blades having openings which cooperate to form a generally circular aperture;
    guide means mounted on one of said plates for restricting each of said blades to axial rectilinear movement; and
    cam means mounted on one of said plates for simultaneously moving said blades rectilinearly to vary the size of said aperture.

7. Apparatus as claimed in claim 6 wherein said cam means comprises a rotatable member carrying a plurality of cam pins engageable with said blades.

8. Apparatus as claimed in claim 7 wherein said guide means includes a pair of elongated guide slots in each of said blades and a pair of guide pins for each blade mounted on one of said plates and received by said slots.

* * * * *